(12) United States Patent
Dai et al.

(10) Patent No.: US 8,787,244 B2
(45) Date of Patent: *Jul. 22, 2014

(54) METHOD AND DEVICE FOR USER COOPERATIVE COMMUNICATION

(75) Inventors: Gao Yang Dai, Hong Kong (CN); Wai Ho Mow, Hong Kong (CN)

(73) Assignee: Hui Long Fund Limited Liability Company, Wilmington, DE (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/415,379

(22) Filed: Mar. 8, 2012

(65) Prior Publication Data

US 2012/0176888 A1 Jul. 12, 2012

Related U.S. Application Data

(63) Continuation of application No. 12/431,860, filed on Apr. 29, 2009, now Pat. No. 8,155,049.

(51) Int. Cl.
*H04B 7/14* (2006.01)
(52) U.S. Cl.
USPC .......................................... 370/315; 370/252
(58) Field of Classification Search
USPC ......... 370/315, 242, 206, 328, 338, 351–352, 370/342, 402, 474
See application file for complete search history.

(56) References Cited

U.S. PATENT DOCUMENTS

| 8,155,049 | B2 * | 4/2012 | Mow et al. ..................... 370/315 |
| 2005/0152264 | A1 | 7/2005 | Siwiak |
| 2008/0065946 | A1 * | 3/2008 | Choi et al. |
| 2009/0222711 | A1 | 9/2009 | Belogolovy |
| 2010/0110966 | A1 | 5/2010 | Palanki et al. |
| 2010/0110967 | A1 * | 5/2010 | Sartori et al. ................. 370/315 |
| 2010/0246474 | A1 * | 9/2010 | Zhang et al. .................. 370/315 |

OTHER PUBLICATIONS

Cover, et al. "Capacity theorems for the relay channel," IEEE Transactions on Information Theory, vol. 25, pp. 572-584, 1979.

Sendonaris, et al. "User cooperation diversity. Part I. System description," IEEE Transactions on Communications, vol. 51, pp. 1927-1938, 2003.

Laneman, et al. "An efficient protocol for realizing cooperative diversity in wireless networks," 2001 IEEE International Symposium on Information Theory, pp. 294, 2001.

Sneessens, et al. "Soft Decode and Forward Improves Cooperative Communications," 2005 6th IEE International Conference on 3G and Beyond, pp. 1-4, 2005.

Bui, et al. "A decode and forward cooperation scheme with soft relaying in wireless communication," IEEE 8th Workshop on Signal Processing Advances in Wireless Communications, pp. 1-5, 2007.

Li, et al. "Low complexity iterative decoding for bit-interleaved coded modulation," IEEE Transactions on Wireless Communications, vol. 5, pp. 1966-1970, 2006.

(Continued)

*Primary Examiner* — Kwang B Yao
*Assistant Examiner* — Syed M Bokhari
(74) *Attorney, Agent, or Firm* — Amin, Turocy & Watson, LLP

(57) ABSTRACT

A wireless network system and corresponding methodologies that operate in a user cooperative communication system are provided. In operation, the system either combines packets transmitted from a direct channel with packets transmitted from and a relay channel, or uses erroneously relayed packets to assist decoding a direct packet.

20 Claims, 10 Drawing Sheets

(56) References Cited

OTHER PUBLICATIONS

Akyildiz, et al. "Maximum ratio combining performance with imperfect channel estimates," 2002 IEEE International Conference on Acoustics, Speech, and Signal Processing, vol. 3, pp. III-2485-III-2488 vol. 3, 2002.

Nosratinia, et al. "Cooperative communication in wireless networks," Communications Magazine, IEEE, vol. 42, pp. 74-80, 2004.

Hagenauer, et al. "Iterative decoding of binary block and convolutional codes," IEEE Transactions on Information Theory, vol. 42, pp. 429-445, 1996.

Sendonaris, et al. "User cooperation diversity. Part II. Implementation aspects and performance analysis," IEEE Transactions on Communications, vol. 51, pp. 1939-1948, 2003.

OA dated Oct. 18, 2010 for U.S. Appl. No. 12/431,860, 35 pages.

* cited by examiner

METHOD AND DEVICE FOR USER COOPERATIVE COMMUNICATION

RELATED APPLICATION

This application is a continuation of U.S. patent application Ser. No. 12/431,860 (issued as U.S. Pat. No. 8,155,049), filed on Apr. 29, 2009, and entitled "METHOD AND DEVICE FOR USER COOPERATIVE COMMUNICATIONS", the entirety of which is herein incorporated by reference.

TECHNICAL FIELD

The subject disclosure relates generally to wireless communication systems wherein relaying is used to enhance performance. In particular, the subject disclosure relates to a method and arrangement for providing diversity in a wireless communication system.

BACKGROUND

The advantages of multiple-input multiple-output (MIMO) systems have been widely acknowledged, to the extent that certain transmit diversity methods have been incorporated into wireless standards. Although transmit diversity is clearly advantageous on a cellular base station, it may not be practical for other scenarios. Specifically, due to size, cost, or hardware limitations, a wireless agent may not be able to support multiple transmit antennas. Recently, a new class of methods called cooperative communication has been proposed that enables single antenna mobiles in a multi-user environment to share their antennas and generate a virtual multiple-antenna transmitter that allows them to achieve transmit diversity.

FIG. 1 shows a preliminary explanation of cooperative communication. The basic communication elements for cooperative communication systems are two mobile agents and one base-station communicate via independent fading channels. Although each mobile has one antenna and cannot individually generate special diversity, cooperative techniques make it possible for one mobile to forward some version of information for the other, thus achieving spatial diversity.

FIG. 2 shows general representation of cooperative communication, which includes source node (S), relay node (R) and destination node (D). The three channels between them are called direct channel 202, interlink channel 204 and relay channel 206 correspondingly. Various schemes have been proposed to explore the benefits of cooperative communications. Existing two categories of cooperative communication are amplify-and-forward (AF) and decode-and-forward (DF). The baseband discrete time signals received at destination node and relay node can be expressed as $$y_{SR}(k)=h_{SR}(k)x_S(k)+n_{SR}(k), \text{ and}$$

$$y_{SD}(k)=h_{SD}(k)x_S(k)+n_{SD}(k).$$

where x and y are the transmitted symbol and the received symbol, respectively. The subscripts SR and SD stand for source-relay and source-destination, respectively. Transmission power is normalized to one here. $h_{SR}$ and $h_{SD}$ are the fading coefficients to capture the effects of attenuation and multi-path fading to the corresponding links. They are assumed to be quasi-static over a whole packet. When the AF scheme is employed, the relay node simply amplifies the received signal and forwards it to the destination.

$$y_{RD}(j)=h_{RD}(j)\beta y_{SR}(k)+n_{RD}(j),$$

where the factor $\beta$ can be calculated as $\beta=\sqrt{1/(2\sigma_h^2+2\sigma_n^2)}$, and $\sigma_h^2$ and $\sigma_n^2$ are the variances of $h_{SR}$ and $n_{SR}$, respectively. Hard-output decoding, re-encoding and forwarding are involved at the relay if the DF scheme is implemented. The transmission between the relay node and the destination node can be represented as:

$$y_{RD}(j)=h_{RD}(j)x_R(j)+n_{RD}(j),$$

where $y_{SR}$ is decoded to generate another copy of information bits u, and $x_R$ is obtained by encoding u.

Both schemes have their advantages over the other: AF keeps soft information and DF explores code structure. DF schemes are generally considered outperforming AF under the expectation of reliable decoding at the relay. However, DF lacks the main advantages of AF and vice versa: DF regenerates the signal while AF does not lose soft information. Hence, a new user cooperative technique which enables both to regenerate the signal and to keep soft information is desired.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the invention, a user cooperative communication method is provided. The method that is specially designed for scenarios when quality of interlink may be very bad is provided. The method exploits the erroneously decoded packet at the relay nodes as side information to assist decoding of the direct packet at the destination node.

The method comprises an act of receiving a direct packet, relay packet, an indication of whether an interlink packet passes a packet error detection, and a packet reliability of the relay packet if the interlink packet fail to pass a packet error. The direct packet is decoded if the direct packet passes a packet error detection test. If the direct packet and the relay packet fails to pass the packet error detections but the interlink packet does, the direct and relay packet are combined and then decoded. If the direct packet and the interlink packet fail to pass the packet error detections but the relay packet does, the direct packet is decoded with a pre-determined un-scaled a priori log-likelihood ratio (LLR). If the direct packet, interlink packet, and relay packet all fail to pass the packet error detection, the direct packet is decoded with a pre-determined scaled a priori LLR. The bit size of packet reliability is usually much less than the size of relay packet. In other words, the transmission of a packet reliability value is negligible.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
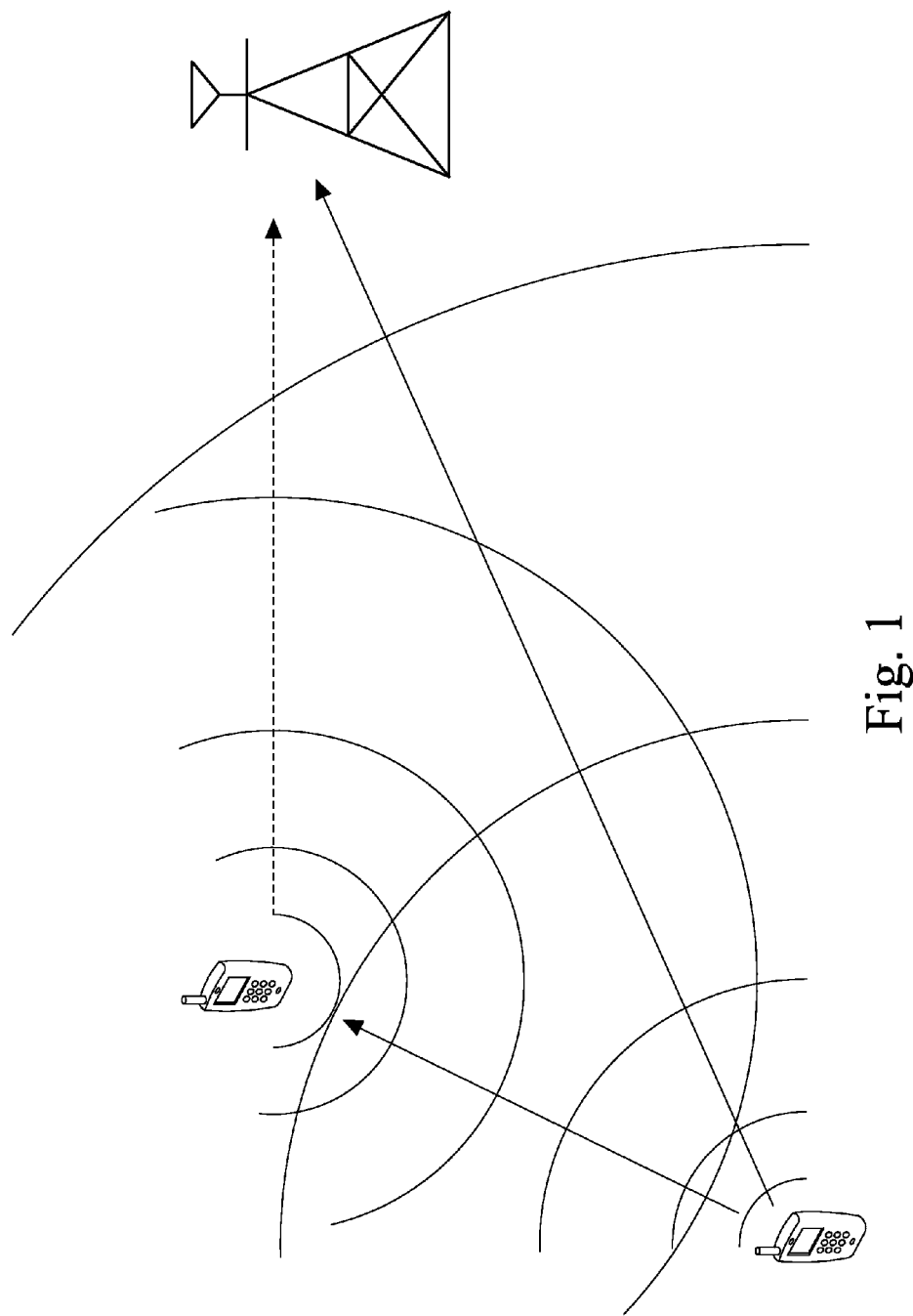
FIG. 1 shows a preliminary explanation of cooperative communication.
Figure 2:
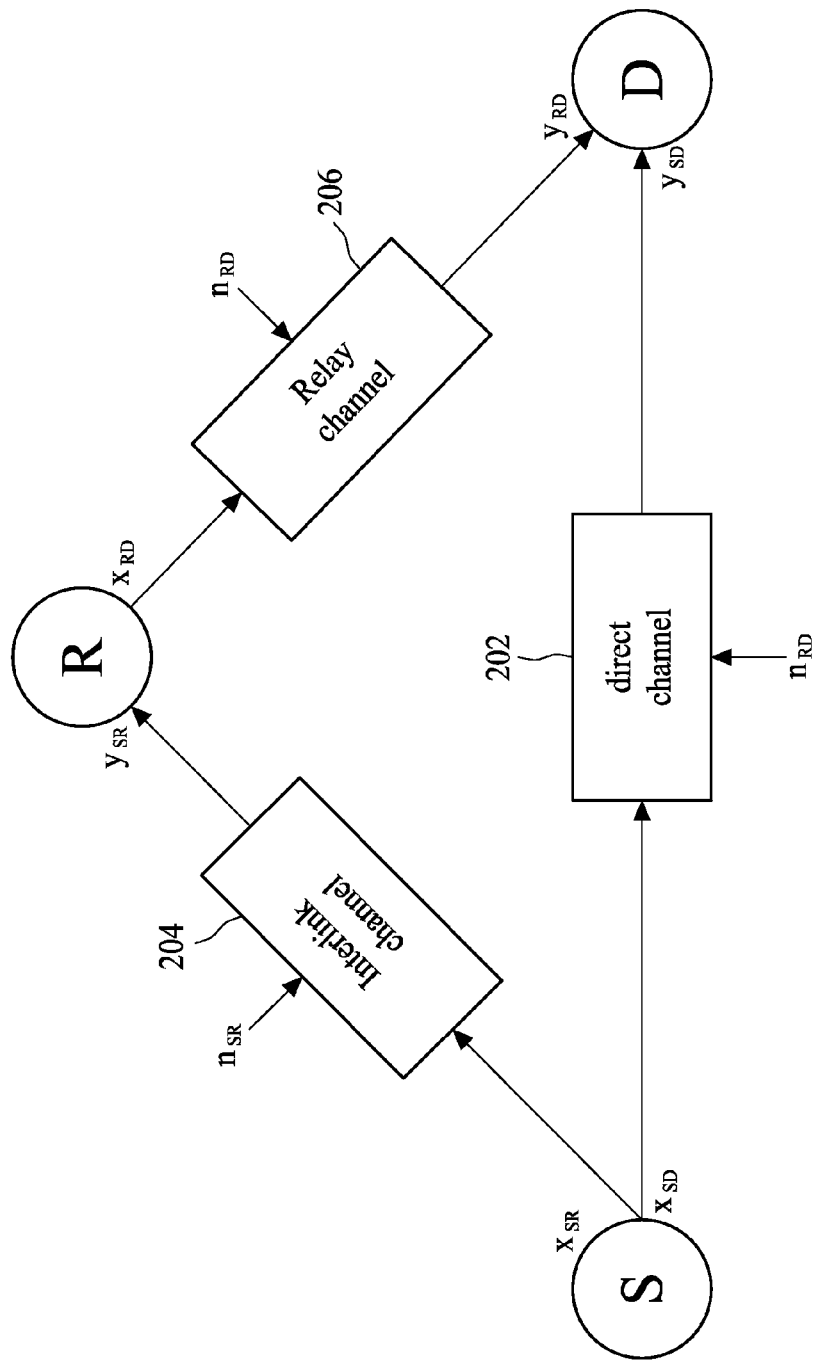
FIG. 2 shows a general representation of cooperative communication, which includes a source node, a relay node and a destination node.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module" and "system" are intended to refer to a computer-related entity, either hardware, a combination of hardware and software, software, or software in execution. For example, a module can be, but is not limited to being, a process running on a processor, a processor, an object, an executable, a thread of execution, a program, and/or a computer. By way of illustration, both an application running on a server and the server can be a module. One or more modules can reside within a process and/or thread of execution, and a module can be localized on one computer and/or distributed between two or more computers.

Figure 3:
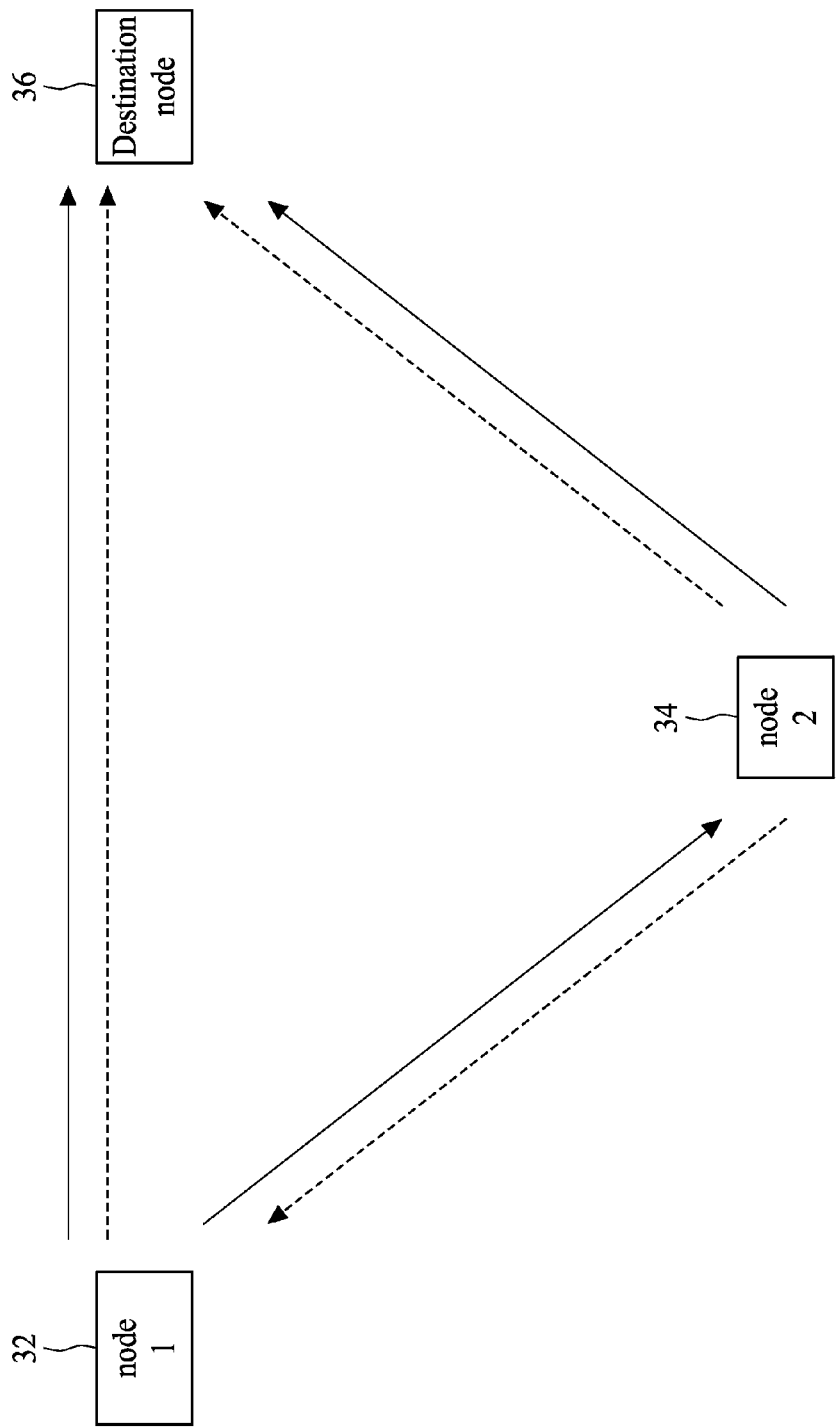
FIG. 3 shows two example cooperative communications in accordance with some of the embodiments.

FIG. 3 shows two example cooperative communication systems in accordance with some of the embodiments, which includes node one 32, node two 34 and destination node 36. In cooperative wireless communication, what is concerned are wireless agents in wireless network may increase their effective quality of service via cooperation. The implementation of these nodes could be, but not limited to, user equipments, handheld devices, hub switches or any other alike. Each wireless agent is assumed to transmit data as well as act as a cooperative agent for another. For example, node one 32 could be the source node, and the node two 34 could be the relay node. The transmitted signal follows the direction shown as solid lines. Alternatively, node two 34 could be the source node, the node one 32 could be the relay node, and the transmitted signal following the direction shown as dashed lines.

A cooperative communication system is provided for improving the efficiency and simplifying the complexity of the relay node. When the quality of direct channel is good, the destination node decodes the packet transmitted from the direct channel. If the packet transmitted from the direct channel is corrupted during the direct channel, the destination node can use the packet transmitted from the relay node as side information. The side information is then used to assist decoding of the direct packet. The following paragraphs give further details of the operation of the cooperative communication system.

In some embodiments, the destination node and relay node operate in different modes when encountering different channel conditions for achieving adaptability to channel conditions. Table 1 lists the channel conditions that involve different operation modes of the destination node and relay node.

TABLE 1

Operation modes vary with channel conditions

| Direct channel | Interlink channel | Relay channel | Operation modes |
|---|---|---|---|
| Good | — | — | operation mode 1 |
| Poor | Good | Good | operation mode 1 |
| Poor | Good | Poor | operation mode 2 |
| Poor | Poor | Good | operation mode 3 |
| Poor | Poor | Poor | operation mode 4 |

If the direct channel is good, the cooperative communication system in accordance with some embodiments operates in operation mode 1. In the operation mode 1, if the direct channel is good, no matter what quality of interlink channel and relay channel are, the direct packet is decoded. Alternatively, if both the interlink channel and the relay channel are good, even the direct channel is poor, the cooperation communication system can operate in operation mode 1. The rest of modes are employed when at least two channels are poor. In some embodiments, the criterion of channel quality can be Signal-to-Noise Ratio (SNR). For example, if the SNR over certain channel exceeds a pre-determined level, then the channel can be regarded as good. In other embodiments, the criterion of channel quality can be the result of packet error detection. For example, if the packet transmitted through certain channel can be decoded without any error detected, then the channel condition can be viewed as a good one. Each of the four operation modes from Table 1 will be described in greater detail infra with reference to FIG. 8.

Figure 4:
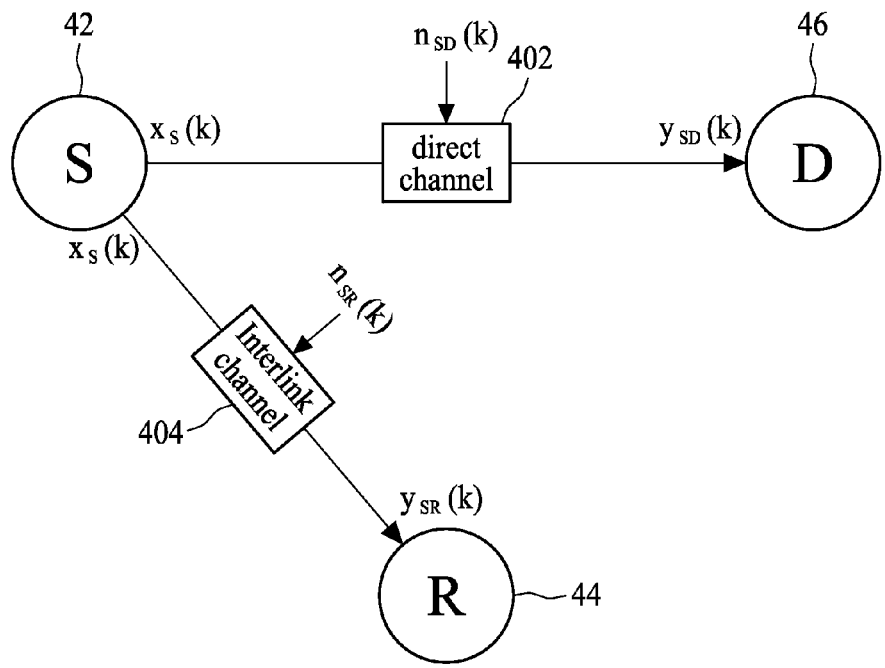
FIG. 4 shows that in time frame k, the source node broadcasts signals to the direct channel and the interlink channel.
Figure 5:
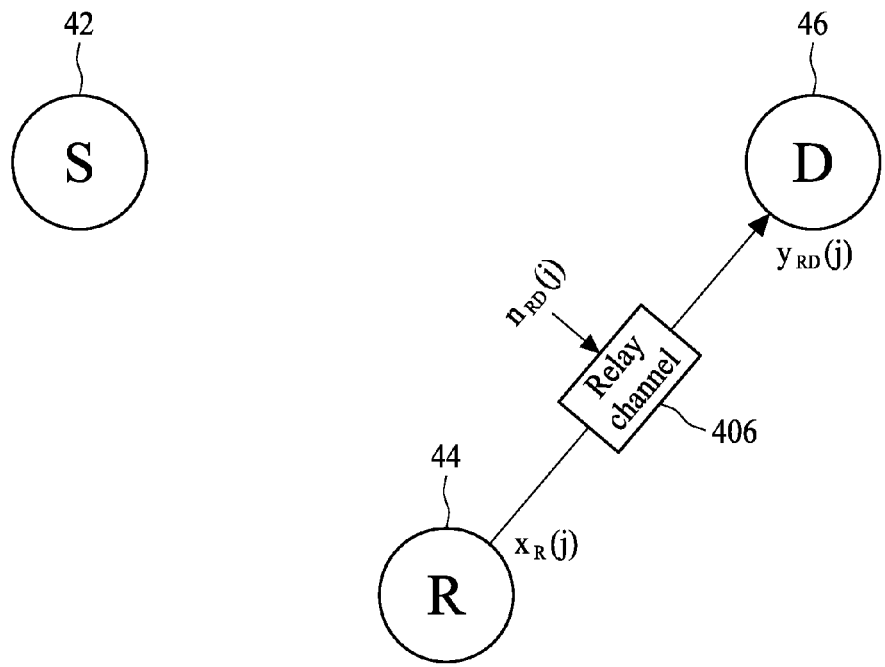
FIG. 5 shows that in time frame j, the relay node transmits relay packets to the relay channel
Figure 6A:
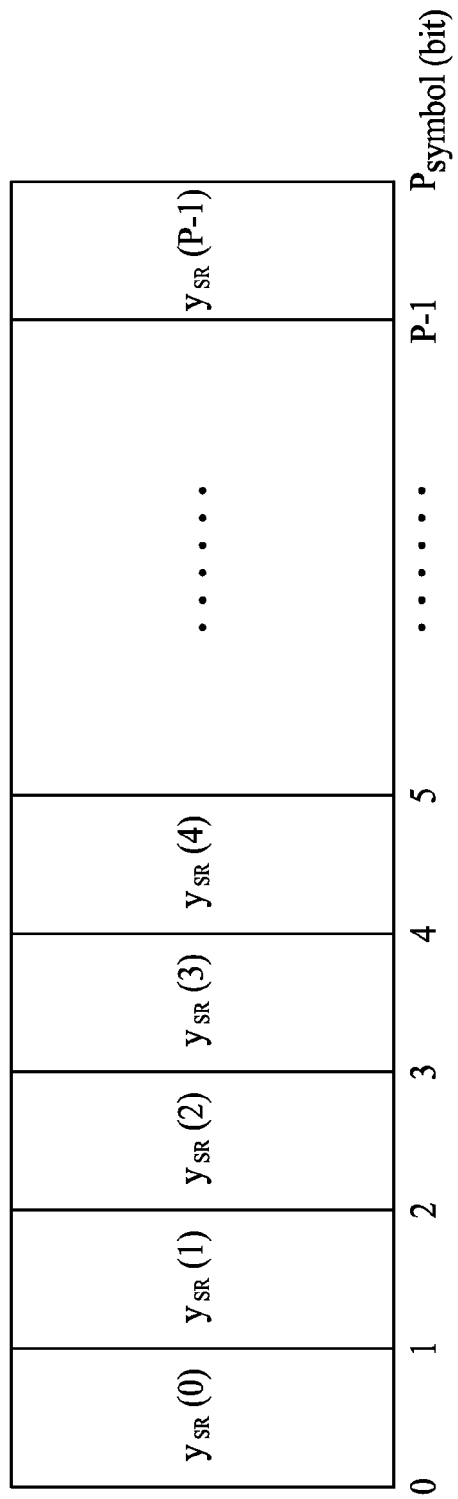
FIG. 6A shows an example packet format with P symbols.

FIG. 4 shows that in a first time frame k, the source node 42 can broadcast signal $x_S(k)$ into direct channel 402 and interlink channel 404. FIG. 5 shows that in a second time frame j, the relay node 44 transmits signal $x_R(j)$ to relay channel 406. Direct channel, interlink channel and relay channels are all half duplex, so that each node can only transmit or receive signals at one time slot, but not simultaneously. Also, the nodes are assumed have an orthogonal multiple-access scheme, such as time division multiple access (TDMA) or code division multiple access (CDMA), so that signals from different sources do not interfere with each other at receiver side. In some embodiments, the source node 42 and relay node 44 transmits a packet (a stream of symbols) to channels. FIG. 6A shows a packet format with P symbols $y_{SR}(0)$-$y_{SR}(P-1)$, wherein each symbol can represent or convey one or several bits of data, depending on which modulation scheme is used.

Figure 6B:
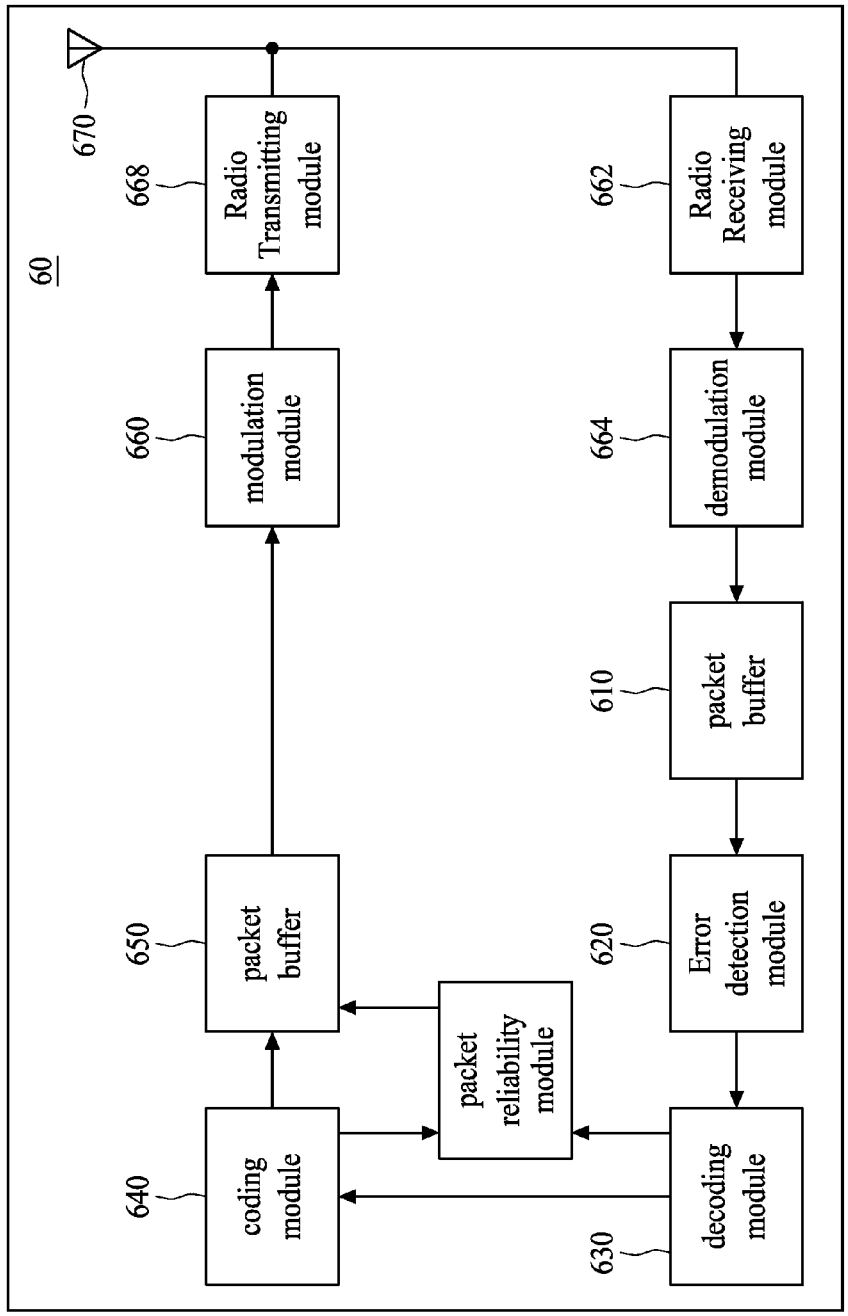
FIG. 6B is a block diagram showing the configuration of a relay node according to one of the subject embodiments.

FIG. 6B is a block diagram showing the configuration of a relay node 60 according to one of the subject embodiments. Relay node 60 comprises packet buffer 610 and 650, error detection module 620, decoding module 630 and coding module 640. The relay node 60 further integrates front-end units for communicating with other network nodes in cooperative communication systems. Said front-end units may be radio receiving module 662, demodulation module 664, modulation module 660, radio transmitting module 668, and antenna 670. Antenna 670, radio receiving module 662 and demodulation module 664 receives, amplifies and digitizes the analog data from transmission media. Packet buffer 610 collects the digitized data stream from the demodulation module 664, and outputs the data in packet format to the error detection module 620. The format of each interlink packet may vary to comply with the format that is transmitted from a source node. Packet buffer 610 and 650 may be an interleaver/de-interleaver pair to scramble the burst error encountered in the transmission channel. Error detection module 620 determines if there is any error in a packet. In some embodiments, the error detection module may be a Cyclic Redundancy Check module (CRC). Moreover, an available error detecting method is not limited to CRC and a vertical parity check, a horizontal parity check, or a Hamming code may also be used alternatively. The decoded results are encoded by coding module 640. The coding module 640 encodes the decoded results to serve as a relay packet. The packet buffer 650 collects the relay packet, an indication of whether the interlink passes the packet error detection, and information about the packet reliability. The modulation module 660, radio transmitting module 668 and antenna 670 are configured to transmit the relay packet into the relay channel.

Figure 6C:
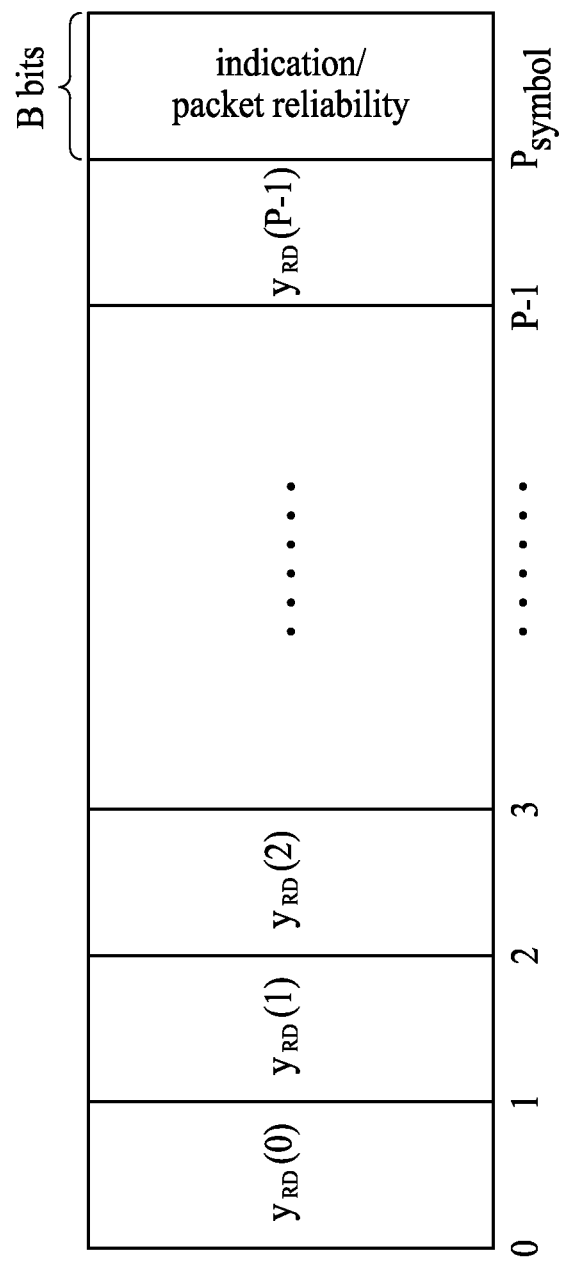
FIG. 6C shows an example packet format of the relay packet.

The indication is also sent through the modulation module 660, radio transmitting module 668 and antenna 670. In some embodiments, the indication of whether the interlink passes the packet error detection is sent through independent channel other than the relay channel. In other embodiments, the indication is packed with the relay packet. In yet other embodiments, the indication and the packet reliability is packet with the relay packet, as shown in FIG. 6C. FIG. 6C shows a packet with P symbols and B bits, wherein the P symbols are corresponded to Symbol $y_{SR}(0)$-$y_{SR}(P-1)$. The bit patterns of the B bits can represent both the indication and packet reliability. B bits can be used to refer to $2^B$ values, and one of the values is reserved for the indication while the rest of values are used for magnitude of packet reliability. For example, there are 3 bits reserved for representing the packet reliability value ranging from 0[000] to 6[110] when the interlink packet fails to passes the error detection test, and the specific pattern [111] indicates that the interlink packet pass the packet error detection test. Please note that the scale of P is usually far larger than B; hence, the overhead of B bits per packet is negligible.

Figure 7:
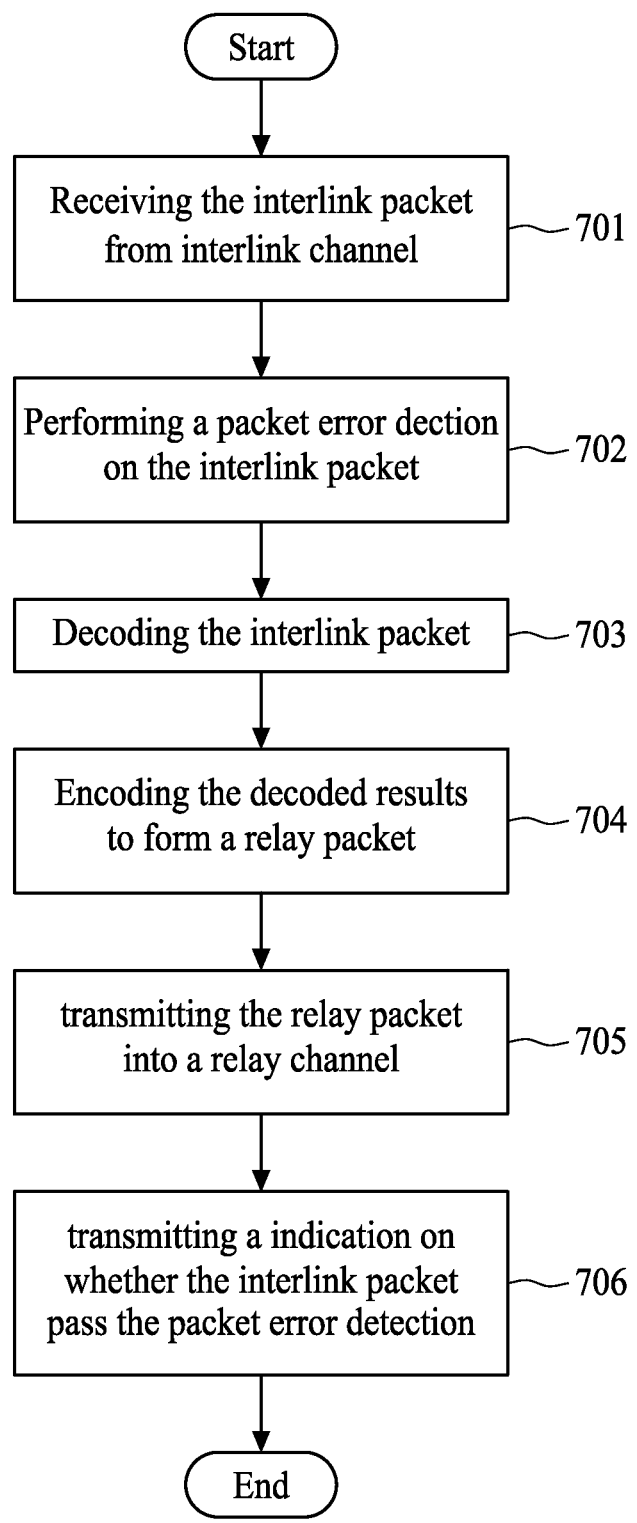
FIG. 7 is a flow chart of a relay method according to one embodiment of the invention.

FIG. 7 is a flow chart of a relay method according to one embodiment of the invention. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the innovation.

In act 701, an interlink packet is received from the interlink channel. In act 702, the packet is examined by a packet error detection. The error detection may be a Cyclic Redundancy Check (CRC), for example. The interlink packet is then decoded, as shown in act 703. In act 704, the decoded results are encoded to serve a relay packet. In act 705, the relay packet is transmitted into a relay channel. In act 706, an indication of whether the interlink packet passes the packet error detection and the packet reliability as well are transmitted.

Figure 8:
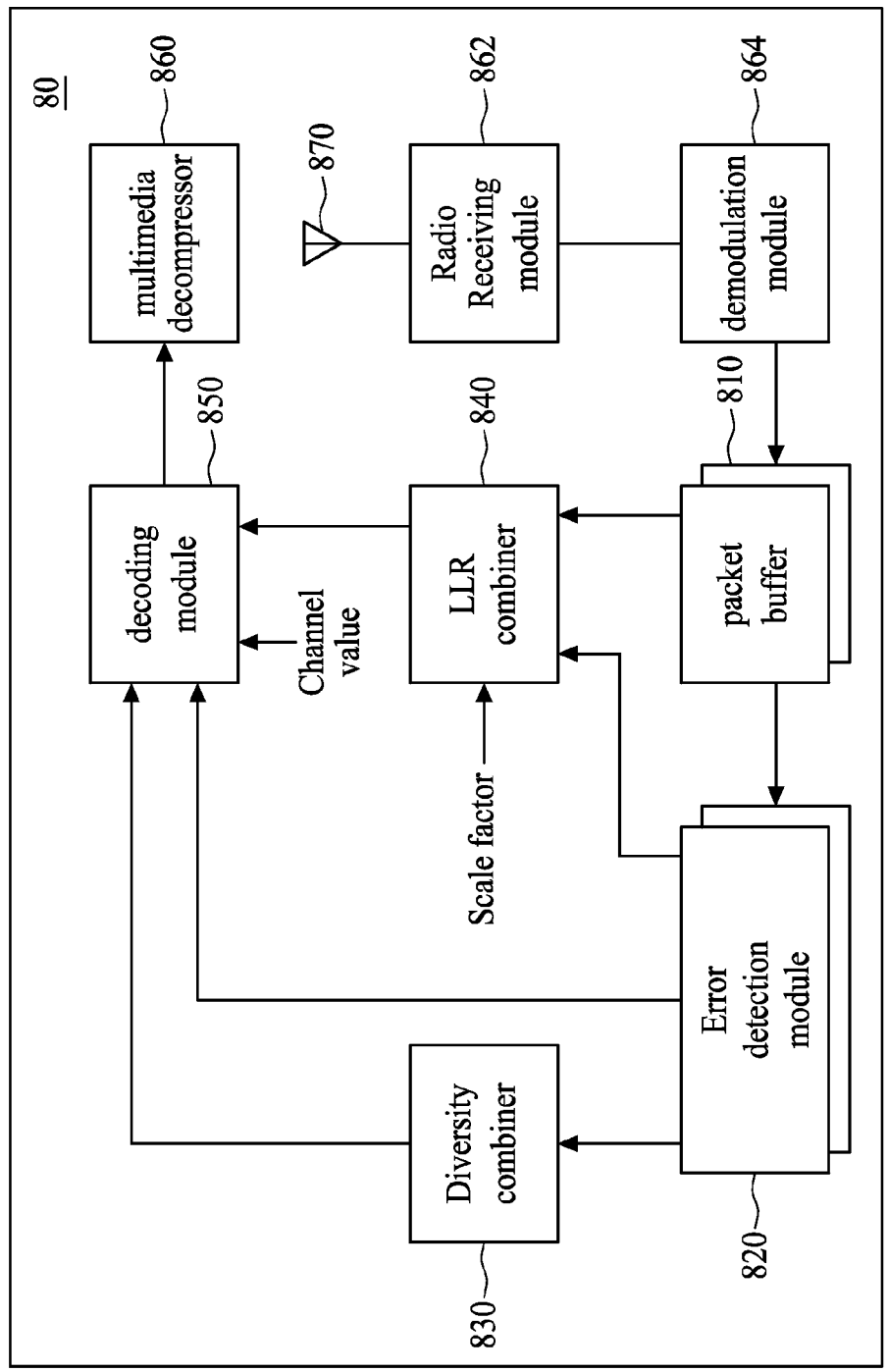
FIG. 8 is a block diagram showing the configuration of a destination node according to one of the subject embodiments.

FIG. 8 is a block diagram showing the configuration of a destination node 80 according to one of the subject embodiments. Destination node 80 comprises a packet buffer 810, error detection module 820, Log-likelihood ratio (LLR) combiner 840, diversity combiner 830, decoding module 850, multimedia de-compressor 860, radio receiving module 862, demodulation module 864 and antenna 870. Antenna 870, radio receiving module 862 and demodulation module 864 are configured to receive data streams from a direct channel and relay channel. Packet buffer 810 collects the data stream from the demodulation module 864 to form a direct packet and relay packet, and outputs the packets to the error detection module 820. Packet buffer is also configured to pick up the packet reliability of the relay packet and an indication on whether an interlink packet passes the packet error detection from the data stream. Please note that the packet reliability of the relay packet and the indication does not have to be transmitted via direct channel or relay channel. Packet buffer 810 is capable to store the direct packet and the relay packet. Packet buffer 810 may be an interleaver/de-interleaver to scramble the burst error added in the direct channel or relay channel.

Error detection module 820 is configured to perform packet error detection on the packets, to determine if there is any error in the direct packet and the relay packet. In some embodiments, the error detection module may be a CRC module. Moreover, an available error detecting method is not limited to CRC and a vertical parity check, a horizontal parity check, or a Hamming code may also be used alternatively. In some embodiments, the CRC code used by the error detection module is a perfect CRC code, which can detect any error in the decoded bits, eliminating the probability of performance degradation due to undetectable errors.

Decoding module 850, LLR combiner 840 and diversity combiner 830 operate in four different kinds of modes, depending on the pass/fail of each packet. In other embodiments, the error detection module can be replaced by other channel quality detector, such as an SNR estimator. In that case, the operation modes of the decoding module 850, LLR combiner 840 and diversity combiner 830 are dependent upon indexes of the channel quality.

In operation mode 1, either the direct packet passes the packet error detection test, or both the interlink and relay packets pass the packet error detections. The decoding module 850 performs hard-output decoding on the received packets. If the direct packet passes the error detection, decoding module 850 decodes the direct packet.

In operation mode 2, the direct packet and the relay packet fail to pass the packet error detection, but the relay packet pass. The diversity combiner 830 combines the relay packet and the direct packet by a diversity combining algorithm. In other words, the diversity combiner is configured to combine the direct packet and the relay packet received via separate channels with the objective of providing a single resultant signal that is superior in quality to any of the contributing signals. For example, the diversity combiner 830 may be a Maximum Ratio Combiner (MRC), which the signals of each packet are weighted summed—the weight of each packet is made proportional to the Root-Mean-Square (RMS) signal level and inversely proportional to the mean square noise level of the subject packet.

In operation modes 3, the direct packet and the interlink packet fail to pass the packet error detections, but the relay packet does. The LLR combiner 840 computes the un-scaled a priori LLR by utilizing side information and the channel value of the direct channel. Mathematically, the un-scaled a priori LLR is the a priori probability of every bit of the direct packet in the LLR form given by the following formula:

$$L(x|y) = L(x) + L(y|x),$$

where $L(x)$ is the side information, $L(y|x)$ represents the channel value, which can be calculated by:

$$L(y|x) = 2Re(yh^*)/\sigma_n^2,$$

$L(\bullet)$ represents the LLR of the value in the bracket, y is the received signal of any bit in the direct packet, x is the transmitted signal corresponding to y, $h^*$ is the complex conjugate of the direct channel fading coefficient, and $\sigma_n^2$ is the power spectral density of a zero-mean additive white Gaussian noise of the direct channel.

In operation mode 4, all the direct packet, interlink packet and the relay packet fail to pass the packet error detections. The LLR combiner 840 computes a priori LLR by utilizing side information and the channel value of the direct channel. The a priori LLR is formed according to the following formula:

$$L(x|y) = L(x) + L(y|x),$$

where the side information $L(x)$ has been scaled by a scale factor. The scale factor can be fixed to a pre-determined value, or can be adjusted according to the transmission environment of the cooperative communication system. The scale factor is a real number larger than zero but less than one.

The side information is composed by multiplying a sign and the magnitude of the sign. The sign of the side information can be the hard-decision output of decoding the relay packet. In some embodiments, the magnitude of the side information can be the packet reliability of the relay packet, which reflects the level of trustworthiness of the forwarded, hard-decision bits of the relay packet. Based on this knowledge, it is reasonable to scale down the side information when the relay packet fails to pass the packet error detection.

One approach to obtain the packet reliability is Bit Error Rate (BER) based. The packet reliability (PR) can be calculated from expectation of the bit error rate $p_e$, noted as:

$$PR = \log \frac{1 - E[p_e]}{E[p_e]}.$$

The bit error rate $p_e$ can be calculated from the probability of transmitted coded symbol $x_i$ given received symbol $y_i$, noted as:

$$p_e = \min_{x_i = \pm 1} p(x_i | y_i)$$

$$= \min_{x_i = \pm 1} \frac{\exp\left[-\frac{|y_i - h_i x_i^2|}{2\sigma_n^2}\right]}{\exp\left[-\frac{|y_i - h_i|^2}{2\sigma_n^2}\right] + \exp\left[-\frac{|y_i - h_i|^2}{2\sigma_n^2}\right]}$$

$$= \min_{x_i = \pm 1} \frac{1}{1 + \exp\left[-x_i \frac{2\mathrm{Re}\{y_i h_i^*\}}{\sigma_n^2}\right]},$$

where $h_i$ is the corresponding fading coefficient, $\sigma_n^2$ is the noise variance of the received symbol, and $\mathrm{Re}\{\bullet\}$ denotes the real part of the complex number in the bracket.

In another embodiment, the packet reliability is obtained by taking average of the bit reliability (BR) over the whole packet, noted as:

$$PR = E[BR] = E\left[\left|\log \frac{1 - p_e}{p_e}\right|\right].$$

Combining (formula) and (formula), PR can be written as:

$$PR = \frac{2}{\sigma_n^2} E_{x,n}(|\hat{n}|),$$

wherein $\hat{n} = N\left(x|h|^2, \frac{|h|^2 \sigma_n^2}{2}\right).$

The data stream output from the decoding module 850 can be processed by a multimedia de-compressor 860, such as audio/video decoder to transform the data stream into audible/visible signal.

Figure 9:
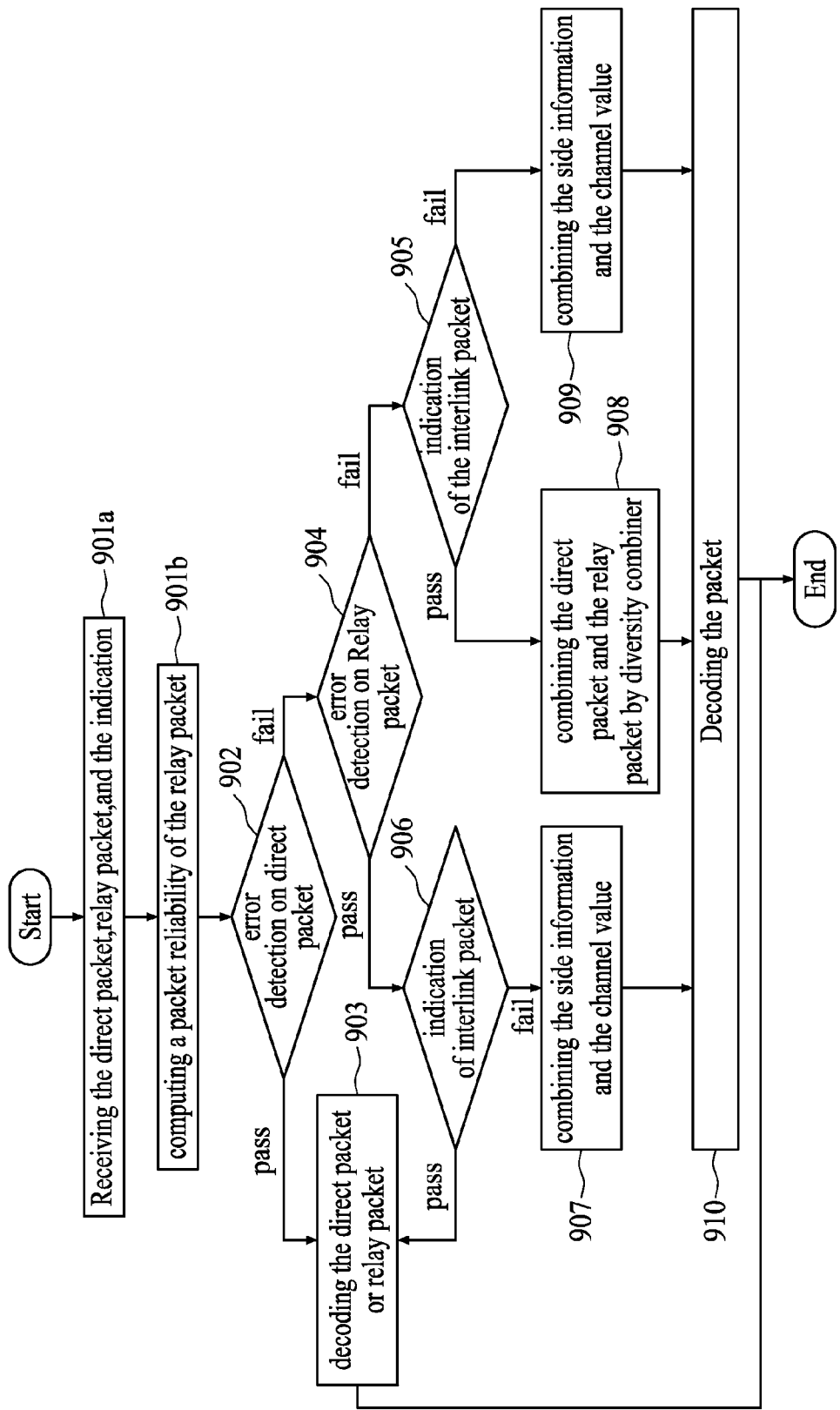
FIG. 9 shows a flow chart of user cooperation method in accordance with one embodiment of the invention.

FIG. 9 shows a flow chart of user cooperation method in accordance with one embodiment of the invention. In act 901a, the direct packet, interlink packet, and an indication on whether an interlink packet has pass the packet error detection are received. In act 901b, the packet reliability of the relay packet is computed. In act 902, an error detection is performed on the direct packet. In act 904, the error detection is performed on the relay packet. In steps 905 and 906, the error detection is performed in the interlink packet. Steps 903, 908, 907, 909 respectively represent the operation mode 1, 2, 3, and 4 when encountering different channel conditions. In act 903, the direct packet is decoded if the direct packet passes the error detection. Or, if both the interlink packet and the relay packet pass the error detections, the relay packet is decoded. In act 908, the direct packet and the relay packet are combined by a diversity combiner to obtain a optimal combined method. In act 907, the side information and the channel value is combined to form a priori probability of direction packet. This side information is summed with the channel value of direct packet to compose a priori probability of the direct packet. In act 909, the side information is multiplied with a scale factor. The scaled side information is combined with the channel value to form the a priori probability of the direct packet.

Demodulation and decoding are first carried out at the relay on the inter-link packets. CRC is then implemented to verify the packet transmission between the source and the relay is successful. If the decoded bits pass the CRC test, the relay operates in hard forwarding mode, or the conventional DF mode. If the decoded bits fail the CRC test, the relay switches to soft forwarding mode, forwarding both sign and magnitude of the soft information to the base-station.

With this a priori probability of the direct packet in LLR form as input to the soft-input-hard-output Viterbi algorithm (VA), the information contained in the relay packet can be fully exploited even when the inter-link quality is poor. It should be emphasized here that the soft-input-hard-output VA is much less complex than those decoding algorithms employed in the previous soft relaying techniques, such as soft-input-soft-output Viterbi algorithm and the iterative decoding algorithm.

The user cooperative communication system provides an improved efficiency relaying method by exploiting the erroneously decoded packets at the relay node. The erroneously decoded packet is served as side information to assist decoding the direct packet. In addition, the design of the relay node is simple and can be compatible with existing DF schemes since the side information from the relay node is encoded and transmitted in the same format as the usual data packet, except reserving a small fixed number of bits (e.g. 3-6 bits) to represent the packet reliability. The user cooperative communication system not only allows low complexity implementation, but also offers considerable error performance gain. Simulation results have demonstrated that the user cooperative communication system outperforms conventional cooperative communication system by up to 2 dB in one scenario, especially when the interlink channel is poor.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising: receiving, by a system including at least one processor, a first packet via a direct channel; receiving a second packet via a relay channel; receiving an indication in the second packet indicating that an interlink packet passed or failed a first packet error detection; and in response to the first packet failing to pass a second packet error detection, the second packet indicating that the interlink packet failed to pass the first packet error detection and the second packet passing the second packet error detection, decoding the first packet using a log-likelihood ratio (LLR) comprising side information relating to the second packet.

2. The method of claim 1, further comprising: receiving a packet reliability of the second packet in response to the indication in the second packet indicating that the interlink packet failed to pass the first packet error detection.

3. The method of claim 1, further comprising: forming the LLR using a function of the side information from the second packet and a channel value of the first packet; and in response to the first packet and the second packet failing to pass the second packet error detection and the second packet indicating that the interlink packet failed to pass the first packet error detection, decoding the first packet with the LLR.

4. The method of claim 1, further comprising: in response to the second packet having passed the second packet error detection and the second packet indicating that the interlink packet passed the first packet error detection, decoding the second packet.

5. The method of claim 1, further comprising: in response to the first packet and the second packet failing to pass the second packet error detection and the second packet indicating that the interlink packet passed the first packet error detection, combining the first packet and the second packet.

6. The method of claim 5, wherein the combining the first packet and the second packet further comprises: decoding the first packet and the second packet using maximal ratio combining, and summing the first packet and the second packet according to a first weight of the first packet and a second weight of the second packet, wherein the first weight of the first packet is proportional to a first root mean square (RMS) signal level of a corresponding first packet and inversely proportional to a mean square noise level of the corresponding first packet and wherein the second weight of the second packet is proportional to a second RMS signal level of a corresponding second packet and inversely proportional to a mean square noise level of the corresponding second packet.

7. The method of claim 1, wherein the decoding based on the LLR further comprises decoding based on a summing of the side information about the second packet, and summing a channel value of the first packet.

8. The method of claim 7, wherein the summing the side information further comprises: decoding a relay packet to a decoded result; encoding the decoded result to obtain signs of the side information; and multiplying the plurality of the signs by a magnitude of the side information.

9. The method of claim 7, wherein the summing the channel value of the first packet further comprises:
determining the channel value as a function of a bit in the first packet, a corresponding bit decoded from the bit in the first packet, a complex conjugate of a fading coefficient of the direct channel, and a variance of zero-mean additive white Gaussian noise of the direct channel.

10. The method of claim 1, wherein the decoding the first packet includes decoding the first packet in response to the first packet passing a cyclic redundancy check.

11. A system, comprising: a memory; and at least one processor, communicatively coupled to the memory, that executes or facilitates execution of one or more system-executable components, including: a receiving module configured to receive a first packet via a direct channel, a second packet via a relay channel, and an indication in the second packet that an interlink packet passed or failed a first packet error detection; an error detection module configured to perform a second packet error detection on the first packet and the second packet; and a decoder configured to decode the first packet using a log-likelihood ratio (LLR) comprising side information relating to the second packet in response to the first packet failing to pass the second packet error detection and the second packet passing the second packet error detection.

12. The system of claim 11, further comprising a packet buffer configured to collect a data stream from the receiving module and to obtain a packet reliability of the second packet.

13. The system of claim 11, further comprising: an LLR combiner configured to form an unscaled LLR using a function of the side information from the second packet and a channel value of the first packet, wherein the decoder module decodes the first packet with the unscaled LLR in response to the first packet failing to pass the second packet error detection, the second packet passing the second packet error detection and the indication in the second packet that the interlink packet failed to pass the first packet error detection.

14. The system of claim 13, wherein the LLR combiner is further configured to form a scaled LLR using the function of the side information from the second packet and the channel value of the first packet, wherein the decoder decodes the first packet with the scaled LLR in response to the first packet and the second packet failing to pass the second packet error detection and the indication in the second packet indicating that the interlink packet failed to pass the first packet error detection.

15. The system of claim 11, wherein the decoder is further configured to decode the second packet in response to the second packet passing the second packet error detection and the indication in the second packet indicating that the interlink packet passed the first packet error detection.

16. The system of claim 11, further comprising a combiner configured to combine the first packet and the second packet in response to the first packet and the second packet failing to pass the second packet error detection and the indication in the second packet indicating that the interlink packet passed the first packet error detection.

17. The system of claim 11, wherein the first packet is decoded using the side information about the second packet and a channel value of the first packet.

18. The system of claim 12, wherein the receiving module further comprises:
- an antenna configured to receive signals from a transmission medium; and
- a radio receiving module, coupled to the antenna, configured to filter selected signals from the received signals, to amplify the selected signals, and to down-convert the selected signals to a pre-determined frequency range, wherein the decoder, coupled to the radio receiving module, is further configured to demodulate the selected signals down-converted by the radio receiving module to form the data stream.

19. A computer-readable storage medium having computer-executable instructions stored thereon that, in response to execution, cause a system including at least one processor to perform operations, comprising: receiving a direct packet via a direct channel and a relay packet via a relay channel; detecting an indication in the relay packet that an interlink packet passed or failed a first interlink packet error detection; performing a second packet error detection on the direct packet and the relay packet; and in response to the direct packet failing to pass the second packet error detection, the the relay packet indicating that the interlink packet failed to pass the first packet error detection, and the relay packet passing the second packet error detection, decoding the direct packet using a log-likelihood ratio (LLR) comprising side information relating to the relay packet.

20. The computer readable storage medium of claim 19, the operations further comprising: in response to the direct packet and the relay packet failing to pass the second packet error detection and the the relay packet indicating that the interlink packet passed the first packet error detection, combining the direct packet and the relay packet.

* * * * *